3,839,547
PROCESS FOR RECOVERING HBr AND BROMINE FROM 2,3,3-TRIBROMO-2-ALKYLALKANES
John G. McNulty and William L. Walsh, Glenshaw, Pa., assignors to Gulf Research & Development Company, Pittsburgh, Pa.
No Drawing. Filed Dec. 1, 1972, Ser. No. 311,369
Int. Cl. C01b 7/10, 7/12
U.S. Cl. 423—500                        8 Claims

ABSTRACT OF THE DISCLOSURE

A process for recovering bromine from 2,3,3-tribromo-2-alkylalkanes which comprises heating the 2,3,3-tribromo-2-alkylalkanes with water.

---

This invention relates to a process for recovering bromine from 2,3,3-tribromo-2-alkylalkanes by heating the same with water.

The 2,3,3-tribromo-2-alkylalkanes that can be treated with water to recover the bromine therefrom can be defined by the following structural formula:

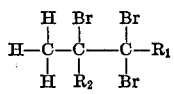

wherein $R_1$ and $R_2$, the same or different, are alkyl groups having from one to five carbon atoms, preferably from one to three carbon atoms, specific examples of which are methyl, ethyl, isopropyl, propyl, isobutyl, butyl, isoamyl and amyl. Specific examples of 2,3,3-tribromo-2-alkylalkanes that can be treated herein include 2,3,3-tribromo-2-methylbutane,
2,3,3-tribromo-2-ethylbutane,
2,3,3-tribromo-2-isopropylbutane,
2,3,3-tribromo-2-propylbutane,
2,3,3-tribromo-2-isobutylbutane,
2,3,3-tribromo-2-butylbutane,
2,3,3-tribromo-2-isoamylbutane,
2,3,3-tribromo-2-amylbutane,
2,3,3-tribromo-2-ethylpentane,
2,3,3-tribromo-2-isopropylpentane,
2,3,3-tribromo-2-propylpentane
2,3,3-tribromo-2-butylpentane,
2,3,3-tribromo-2-ethylhexane,
2,3,3-tribromo-2-propylhexane,
2,3,3-tribromo-2-amylhexane,
2,3,3-tribromo-2-ethylheptane,
2,3,3-isopropylheptane and
2,3,3-tribromo-2-butylheptane.

Of these particularly effective results are obtained when the 2,3,3-tribromo-2-alkylalkane is 2,3,3-tribromo-2-methylbutane.

The 2,3,3-tribromo-2-alkylalkanes treated herein can be obtained from any source, but are preferably obtained from the process defined and claimed in copending Application Ser. No. 311,368, filed Dec. 1, 1972, filed concurrently herewith, entitled Process for Preparing 2,3-Dibromo-2-Alkylalkanes, in the names of John G. McNulty, Glen A. Russell and William L. Walsh, and assigned to the same assignee as the present application, wherein 2-bromo-2-alkylalkanes are reacted with bromine to obtain 2,3-dibromo-2-alkylalkanes but undesirable amounts of 2,3,3-tribromo-2-alkylalkanes are also formed. In said application although a procedure is claimed to inhibit the formation of said 2,3,3-tribromo-2-alkylalkanes, nevertheless some of said tribromoalkane is still formed. By the procedure defined and claimed herein, the bromine in said tribromoalkane is recovered and in so doing the process defined and claimed therein is rendered more commercially attractive.

The process defined herein is simply effected by bringing the tribromo-alkane charge and water into intimate contact with each other and maintaining the same at an elevated temperature for a defined period of time. Since the tribromoalkane charge and water are not miscible in each other the two are desirably maintained in intimate relationship by stirring. The amount of water used relative to the tribromoalkane charge, on a molar basis, is in the range of about 10:1 to about 50:1, preferably in the range of about 20:1 to about 40:1. The temperature during the reaction can range from about 80° to about 200° C., preferably from about 120° to about 170° C. Any pressure sufficient to maintain the water in the liquid phase at reaction temperature can be used. Thus, the pressure can be from about 50 to about 200 pounds per square inch gauge, preferably from about 70 to about 150 pounds per square inch gauge. A residence time of about 15 minutes to about five hours, preferably from about 30 minutes to about two hours, will suffice.

At the end of the reaction the reaction mixture resolves itself into two phases, an upper phase containing the hydrocarbon substantially depleted of bromine and having the appearance of a polymer and a lower aqueous phase containing HBr dissolved therein. The two phases can be separated from each other by any convenient means, for example, by decantation. The HBr can then be recovered from the aqueous phase by any convenient manner, for example, by distillation. To recover the bromine from HBr any convenient method can be employed, for example, reacting HBr with oxygen over a catalyst, such as cerium oxide, as in U.S. Pat. No. 2,536,457 to Martin et al.

The results obtained are unexpected but fortunate. If the treatment herein had been a hydrolysis reaction, the alcohol formed corresponding to the tribromoalkane would have been water soluble and difficult to remove from the aqueous phase and, therefore, would have complicated the recovery procedure. The fact that the tribromoalkane, when depleted of bromine, resulted in a polymer-like product, is surprising and the fact that it forms a separate phase facilitates recovery of the bromine herein.

The process can further be illustrated by the following:

Example I

To a 30 milliliter pressure glass reactor having a thermowell and a magnetic stirring bar there was added 50.7 grams of water and 21.8 grams of 2,3,3-tribromo-2-methylbutane. The reactor was connected to a manifold having a pressure gauge by means of a rubber O-ring adapter. The magnetic stirrer was turned on and the reactor pressured to 25 pounds per square inch gauge with nitrogen. The temperature was increased to 140° C. using a heating mantle. After 30 minutes at 140° C. and 60 pounds per square inch gauge, a sample of the water phase was titrated with 1.0 N KOH solution. It was found that 91.3 mol percent of the bromine on the 2,3,3-tribromo-2-methylbutane charge had been converted to HBr and was dissolved in the lower aqueous layer. The upper polymeric-like material depleted of bromine was easily separable from the aqueous phase by decantation.

Example II

Example I was repeated using 50 grams of water and 20.1 grams of 2,3,3-tribromo-2-methylbutane, which were heated, with stirring, for one hour at 165° C. and 112 pounds per square inch gauge. The lower aqueous layer was found to contain 97.5 mol percent of the bromine on the 2,3,3-tribromo-2-methylbutane as HBr.

Example III

The procedure of Example I was repeated using 503.2 grams of water and 200.2 grams of 2,3,3-tribromo-2-methylbutane, which were heated, with stirring, for one hour at 165° C. and 140 pounds per square inch gauge. The lower aqueous layer was found to contain 98.6 mol percent of the bromine on the 2,3,3-tribromo-2-methylbutane as HBr.

Obviously, many modifications and variations of the invention, as hereinabove set forth, can be made without departing from the spirit and scope thereof, and therefore only such limitations should be imposed as are indicated in the appended claims.

We claim:

1. A process for recovering bromine from a 2,3,3-tribromo-2-alkylalkane which comprises heating a charge consisting essentially of said 2,3,3-tribromo-2-alkylalkane and water, wherein the molar ratio of water to said 2,3,3-tribromo-2-alkylalkane is in the range of about 10:1 to about 50:1 at a temperature of about 80° to about 200° C. and a pressure of about 50 to about 200 pounds per square inch gauge, sufficient to maintain the water in liquid phase, for about 15 minutes to about five hours to obtain a reaction mixture having an upper organic phase and a lower aqueous phase, said upper organic phase being substantially depleted of bromine and having the appearance of a polymer and said lower aqueous phase containing HBr dissolved therein, and thereafter separating said phases from each other.

2. The process of claim 1 wherein HBr is recovered from said aqueous phase.

3. The process of claim 2 wherein bromine is recovered from said recovered HBr.

4. The process of claim 1, wherein said 2,3,3-tribromo-2-alkylalkane is 2,3,3-tribromo-2-methylbutane.

5. The process of claim 1 wherein said heating is in the range of about 120° to about 170° C.

6. The process of claim 1 wherein said heating is effected at a pressure of about 70 to about 150 pounds per square inch gauge.

7. The process of claim 1 wherein the molar ratio of water to said 2,3,3-tribromo-2-alkylalkane is in the range of about 20:1 to about 40:1.

8. The process of claim 1 wherein said heating is carried out over a period of about 30 minutes to about two hours.

References Cited

UNITED STATES PATENTS

| | | | |
|---|---|---|---|
| 3,428,423 | 2/1969 | Egbert | 423—481 |
| 3,299,152 | 1/1967 | Inaba et al. | 260—654 D |
| 3,240,834 | 3/1966 | Kruse et al. | 260—654 D |
| 3,649,700 | 3/1972 | Baader et al. | 260—654 D |
| 3,622,641 | 11/1971 | Crary | 260—654 D |
| 3,346,340 | 10/1967 | Louvar et al. | 423—502 |
| 3,353,916 | 11/1967 | Lester | 423—502 |
| 3,505,010 | 4/1970 | Schiessl | 423—500 |
| 3,379,506 | 4/1968 | Masonne et al. | 423—502 |

OSCAR R. VERTIZ, Primary Examiner

B. E. HEARN, Assistant Examiner

U.S. Cl. X.R.

260—677 XA; 423—481, 502